Figure 1:
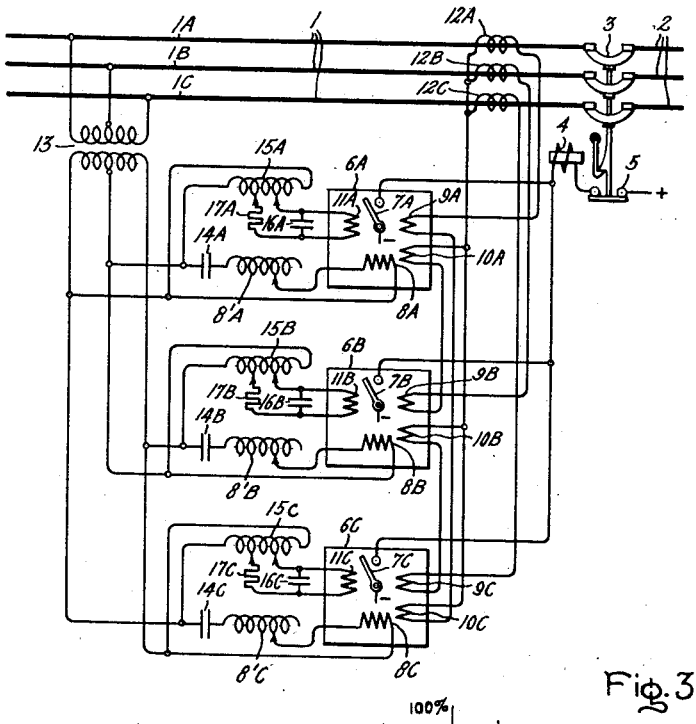

April 19, 1949.  A. R. VAN C. WARRINGTON  2,467,872
PROTECTIVE RELAY FOR ALTERNATING
CURRENT SYSTEMS
Filed Jan. 3, 1947

Inventor:
Albert R. van C. Warrington,
by Ernest C. Britton
His Attorney.

UNITED STATES PATENT OFFICE 2,467,872

PROTECTIVE RELAY FOR ALTERNATING-CURRENT SYSTEMS

Albert R. van C. Warrington, Wallingford, Pa., assignor to General Electric Company, a corporation of New York Application January 3, 1947, Serial No. 720,007

1 Claim. (Cl. 175—294)

My invention relates to improvements in protective relays for alterating current systems and more particularly to instantaneously operating voltage restrained fault responsive relays such, for example, as voltage restrained power directional relays known the to art as mho relays, one example of which is disclosed in my United States Letters Patent 2,405,084, granted July 30, 1946, and assigned to the assignee of this invention.

In this patent, there is disclosed a substantially instantaneously operating mho relay comprising a current winding and a first voltage winding which are respectively energized in accordance with a current and a voltage of an alternating current system and which cooperate to actuate the movable member in accordance with the product of such current, such voltage and the phase angle therebetween. This is called the operating effect, and it may tend to open or to close the relay contacts. Cooperating with the first voltage winding is a second voltage winding, arranged to be energized in accordance with a voltage of the system, to exert on the movable member a restraining effect proportional to the product of the voltages respectively energizing the two windings. This restraining effect tends to keep the relay contacts open.

Both of the voltage windings are tuned to system frequency by capacitors in order to maintain the voltage across these windings after the line voltage has failed because of a fault on the system. The first voltage winding, which is called a polarizing winding because it cooperates with the current winding to give the mho relay its directional action, is series tuned; and the second voltage winding, which is called the restraining winding because it cooperates with the first voltage winding to tend to prevent the closing of the relay contacts, is parallel tuned. This arrangement produces a phase displacement between the voltages across the two voltage windings whereby to provide the restraining action on the movable member. The polarizing winding is series tuned in order to maintain the operating effect of the relay long enough after the occurrence of a fault to insure contact closure and thus effect tripping of the associated isolating circuit breaker. This maintenance of the operating effect is known to the art as "memory action". The restraining voltage winding is parallel tuned in order to maintain the restraining action long enough to override momentary operating effects consequent upon electrical transients in the power line and electrical and mechanical transients in the relay which tend to cause erroneous tripping on faults outside the protected section. The various transients have been eliminated by different means which, with one exception, are already known to the art. Thus, for example, the use of the induction cylinder type of motor element prevents response to offset current waves. Also, a slip clutch between the induction cylinder and the relay contacts has been used to prevent mechanical rebound. The most troublesome transient from the standpoint of overreach, however, has eluded suppression for a long time during the development of the relay until it was finally photographed on the screen of a cathode ray oscillograph. A reproduction of such a transient is shown in one of the figures of this application and will be more fully described herein.

I have found that the formerly used arrangement of tuning the polarizing winding for unity power factor at system frequency to produce memory action was responsible for this troublesome overreach since this tuning caused the circuit of the polarizing winding to oscillate at less than normal frequency as the voltage across the winding gradually dropped after the inception of the fault from the normal value to the fault value. During this period, the voltage across the polarizing winding temporarily lagged the line voltage which was applied to the restraining winding and caused a reduction in the restraining effect. This permitted a contact closing operation of the relay on faults beyond its ohmic setting. If the circuit of the polarizing winding is tuned for unity power factor at $$\frac{1}{\sqrt{1-\frac{R^2C}{4L}}}$$

times normal frequency, this circuit will be resonant at normal frequency and will eliminate this transient. Unfortunately, however, the inductance of the polarizing winding varies due to interaction with the other windings and in general is not constant. In accordance with my invention, I tune the circuit of the polarizing winding for resonance at a predetermined frequency above the frequency of the system by means of a capacitor and an adjustable tuning reactor connected in series relation with the winding whereby to allow sufficient margin for the variation in inductance of the polarizing winding so that the momentary phase shift of the voltage across the restraining winding during the memory action is substantially zero or slightly in the opposite direction. This produces a momentary increase in restraint which may slightly delay the closing operation of the relay for a fault near the ohmic balance point, but such slight delay, in the nature of a half cycle, as may occur on an occasional fault near the cutoff point is far preferable to erroneous tripping which results in an interruption of the much desired continuity of service, particularly as there is no delay for faults occurring elsewhere in the section.

An object of my invention is to provide an improved substantially instantaneously operating distance type of relay which provides the maximum of protection over a predetermined length of a line section of an alternating current system. Another object of my invention is to provide a mho relay which is an improvement over that in my patent, supra. These and other objects of my invention will appear in more detail hereinafter.

My invention will be better understood from the following description when considered in connection with the accompanying drawing, and its scope will be pointed out in the appended claims.

Figure 2:
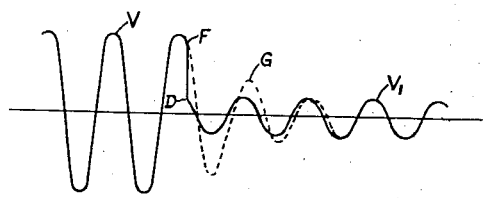
Figure 3:
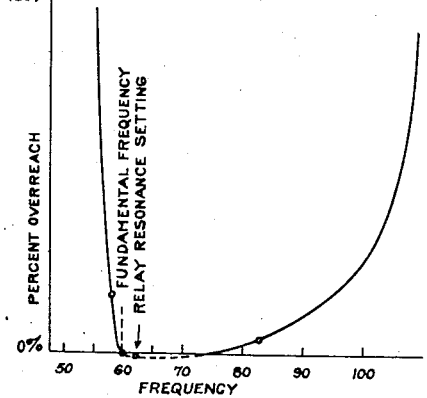

In the accompanying drawing, Fig. 1, diagrammatically illustrates an embodiment of my invention as applied to an alternating current power system; Fig. 2 is an oscillogram of voltage transient conditions effective of overreach in a mho relay; and Fig. 3 is a curve illustrating the relation between the reach of a mho relay and the frequency at which the circuit of the polarizing winding of a mho relay is resonant.

In Fig. 1 of the accompanying drawing, I have diagrammatically illustrated an embodiment of my invention in connection with a protective arrangement for an alternating current power system shown in part as comprising a polyphase circuit 1 having three phase conductors 1A, 1B and 1C. The polyphase circuit 1 is connected to another polyphase circuit 2 by a latched closed circuit breaker 3 having a trip coil 4 which, when energized, effects the opening of the circuit breaker. The circuit breaker 3 also is provided with suitable auxiliary contacts 5 which are connected in series with the trip coil 4 and which are arranged to be closed when the circuit breaker is closed and to be open when the circuit breaker is open.

For effecting the opening of the circuit breaker 3 when a fault occurs on the circuit 1 within a predetermined distance from the circuit breaker, I provide for each phase of the circuit 1 a single phase distance relay 6 of the mho type which, when it moves its movable member 7 to the closed position, completes an energizing circuit for the trip coil 4. In the drawing, each mho relay and associated apparatus has applied thereto a letter to characterize the particular phase conductor of the circuit 1 with which it is associated.

Each mho relay is provided with a voltage winding 8 and two current windings 9 and 10, which are so arranged on the relay structure and so connected to the electric circuit 1 in a manner well known in the art that there is produced on the movable member 7 of the relay an operating torque which is in a direction to move the member 7 to its closed position and which is proportional to $EI \cos(\theta - \phi)$, where E, I and $\theta$ are respectively the voltage, current and power factor of the associated phase of the circuit 1, and $\phi$ is the angle between E and I for maximum torque of the relay. Each mho relay also is provided with a voltage winding 11, which is so arranged on the relay structure and so connected to the electric circuit 1 in a manner well known in the art that it reacts with the potential polarizing winding 8 and produces on the movable member of the relay a restraining torque which is proportional to the square of the voltage of the circuit 1.

Referring now to Fig. 2, the solid line wave form indicates the behavior of the system voltage V as reflected across the secondary of the potential transformer 13 before and after the occurrence of a fault such as short circuit on the power line 1. The occurrence of the fault is indicated at F where the system voltage drops substantially instantaneously to the value D and continues to oscillate at system frequency and at a substantially fixed amplitude $V_1$. If the series resonant circuit of the polarizing winding 8 were tuned for unity power factor at system frequency to produce memory action as heretofore, then the circuit of this winding oscillates at less than system frequency as the voltage across the winding gradually drops from the normal value to the fault value in a manner indicated by the broken line G. During this period, the voltage across the polarizing winding 8 lags the voltage across the restraining winding 11. This causes a reduction in the restraining effect and a consequent tendency for the relay to overreach. It is this troublesome tendency which I propose to eliminate in accordance with my present invention.

The circuit of the voltage winding 8 of each relay also has connected therein improved electrical energy storing means, for producing a memory action. As shown in the drawing, this means consists of a series connected capacitor 14 and a series connected adjustable tuning reactor 8'. The winding 8 and the reactor 8' constitute positive reactance means connected in series with the negative reactance means or capacitor 14. In order to avoid overreach, in accordance with my invention the capacitance of the capacitor 14 and the inductances of the winding 8 and the tuning reactor 8' are so proportioned and adjusted that on the occurrence of a short circuit on the circuit 1 the natural frequency of the circuit of the voltage winding 8 is greater than the frequency of the system by a predetermined amount. I have found, as graphically depicted in Fig. 3, that this amount in the case of a sixty-cycle system may vary from about five per cent to fifteen per cent of the system frequency. Thus, for example, in a sixty-cycle system, the natural frequency of the tuned circuit of the winding 8 may range from sixty-three cycles to sixty-nine cycles as will be apparent from Fig. 3. In this range of tuning, the mho relay has a temporary underreach which prevents false relay operation on external faults without materially slowing the action of the relay under internal faults. To compensate for variations in the capacitance values of the fixed capacitors 14 and also the inductance values of the windings 8, the tuning reactor 8' is adjustable so as to enable accurate setting and testing of the relay.

Each voltage restraining winding 11 is connected to the proper phase of the transformer 13 through an adjustable autotransformer 15 in a manner well known in the art.

As disclosed in my patent, supra, the circuit of the voltage winding 11 of each relay is provided with suitable memory action producing means such as a capacitor 16 connected in parallel with the winding 11 and an isolating resistor 17 connected in series therewith. The capacitor 16 and the resistor 17 are arranged in a manner well known in the art so as to produce a current resonant condition at substantially system frequency in the circuit of the associated voltage winding 11 when the voltage across the power circuit decreases due to a fault on the circuit 1.

It will be noted that each potential winding 8 is connected for series resonance without any resistor so that the memory action lasts as long as possible which may be for several cycles and becomes increasingly effective as the circuit voltage falls, with maximum effectiveness being attained at zero volts. Each potential winding 11 is connected for parallel resonance and with an isolating resistor 17 of such low resistance that the memory action is merely sufficient to insure that the magnetic flux due to the winding decays in a substantially sinusoidal manner whereby to maintain the necessary phase relation with the flux due to the polarizing winding 8 without materially maintaining the magnitude of the voltage across the restraining winding.

The longer memory action of the series resonance circuit overcomes a natural defect of all ordinary directional relays which have the undesirable characteristic of operating more slowly for faults near the relay location since the voltage and hence the operating torque decrease as the fault approaches the relay location. The series resonance circuit, on the other hand, enables the relay to have its maximum speed when the fault is close to the relay location. Tests have shown that when the operating time of the relay is about .03 second for a fault at fifty per cent of the ohmic distance for which the mho relay is set, the operating time is shortened to only .012 second when the fault is so located as to decrease to zero the voltage applied to the relay voltage windings.

While I have, in accordance with the patent statutes, shown and described my invention as applied to a particular system and as embodying various devices diagrammatically indicated, changes and modifications will be obvious to those skilled in the art, and I therefore aim in the appended claim to cover all such changes and modifications as fall within the true spirit and scope of my invention.

What I claim as new and desire to secure by Letters Patent of the United States is:

In a protective relay for an alternating current system, a movable member, means for exerting on said member a torque proportional to the product of a voltage and a current of the system and a function of the phase angle between such voltage and such current comprising winding means energized by a current proportional to a current of the system and cooperating winding means energized by a voltage proportional to a voltage of the system having a capacitor and an adjustable tuning reactor connected in series in the circuit of said voltage winding means whereby said circuit is tuned to five per cent to fifteen per cent greater than the system frequency.

ALBERT R. van C. WARRINGTON.

REFERENCES CITED

The following references are of record in the file of this patent:

UNITED STATES PATENTS

| Number | Name | Date |
| --- | --- | --- |
| 1,877,446 | Curtis | Sept. 13, 1932 |
| 2,287,504 | Warrington | June 23, 1942 |
| 2,405,084 | Warrington | July 30, 1946 |